(12) United States Patent
Krishnapura et al.

(10) Patent No.: US 10,013,261 B2
(45) Date of Patent: Jul. 3, 2018

(54) TECHNIQUES FOR MANAGING OR CONTROLLING COMPUTING DEVICES

(71) Applicant: Intel Corporation, Santa Clara, CA (US)

(72) Inventors: Sheshaprasad G. Krishnapura, Mountain View, CA (US); Vipul Lal, Santa Clara, CA (US); Ty H. Tang, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 130 days.

(21) Appl. No.: 14/020,712

(22) Filed: Sep. 6, 2013

(65) Prior Publication Data

US 2014/0075179 A1    Mar. 13, 2014

Related U.S. Application Data

(60) Provisional application No. 61/698,748, filed on Sep. 10, 2012.

(51) Int. Cl.
  *G06F 15/16*  (2006.01)
  *G06F 9/448*  (2018.01)
  *G06F 11/30*  (2006.01)

(52) U.S. Cl.
  CPC .......... *G06F 9/448* (2018.02); *G06F 11/3031* (2013.01); *G06F 11/3051* (2013.01); *G06F 11/3058* (2013.01)

(58) Field of Classification Search
  CPC ....... H04L 12/46; H04L 12/465; H04L 45/46; H04L 49/40; H04L 67/1002; H04L 41/0893; G06F 9/45558; G06F 9/5077; G06F 9/5061
  See application file for complete search history.

(56) References Cited

U.S. PATENT DOCUMENTS

| 8,793,351 B2* | 7/2014 | Renzin | G06F 15/177 709/220 |
|---|---|---|---|
| 2006/0248325 A1* | 11/2006 | Fung | G06F 1/3203 713/1 |
| 2011/0022812 A1* | 1/2011 | van der Linden | G06F 9/5077 711/163 |
| 2011/0161483 A1* | 6/2011 | Takemura | G06F 9/5088 709/223 |
| 2013/0212279 A1* | 8/2013 | Dutta | G06F 9/5077 709/226 |

* cited by examiner

*Primary Examiner* — Tauqir Hussain
*Assistant Examiner* — Kamran Mohammadi

(57) ABSTRACT

Examples are disclosed for receiving or gathering asset information associated with computing devices housed in respective decentralized locations. The gathered or received asset information may be stored. A portion of the computing devices may be grouped based on the stored asset information to create a virtual rack. An operating parameter of at least some of the computing devices included in the virtual rack may then be managed or controlled.

23 Claims, 7 Drawing Sheets

600

```
┌─────────────────────────────────────────────┐
│ RECEIVE ASSET INFORMATION ASSOCIATED WITH   │
│ COMPUTING DEVICES SEPARATELY HOUSED IN      │
│ RESPECTIVE DECENTRALIZED LOCATIONS          │
│                   602                       │
└─────────────────────────────────────────────┘
                      │
┌─────────────────────────────────────────────┐
│ GATHER ADDITIONAL ASSET INFORMATION ASSOCIATED │
│ WITH EACH OF THE COMPUTING DEVICES          │
│                   604                       │
│  ┌───────────────────────────────────────┐  │
│  │ GATHER ADDITIONAL ASSET INFORMATION VIA│  │
│  │ NETWORK COMMUNICATION LINKS COUPLED TO │  │
│  │ THE COMPUTING DEVICES                  │  │
│  │               606                      │  │
│  └───────────────────────────────────────┘  │
└─────────────────────────────────────────────┘
                      │
┌─────────────────────────────────────────────┐
│ STORE THE RECEIVED ASSET INFORMATION AND THE│
│ ADDITIONAL ASSET INFORMATION IN A DATABASE  │
│                   608                       │
└─────────────────────────────────────────────┘
                      │
┌─────────────────────────────────────────────┐
│ GROUP A FIRST PORTION OF THE COMPUTING DEVICES TO │
│ CREATE A FIRST VIRTUAL RACK BASED, AT LEAST IN PART, │
│ ON THE ASSET INFORMATION STORED IN THE DATABASE │
│                   610                       │
└─────────────────────────────────────────────┘
                      │
┌─────────────────────────────────────────────┐
│ MANAGE OR CONTROL AN OPERATING PARAMETER OF ONE │
│ OR MORE COMPUTING DEVICES INCLUDED IN THE FIRST │
│                VIRTUAL RACK                 │
│                   612                       │
└─────────────────────────────────────────────┘
```

*FIG. 6*

TECHNIQUES FOR MANAGING OR CONTROLLING COMPUTING DEVICES

RELATED CASE

This application claims priority to U.S. Provisional Patent Application No. 61/698,748, filed on Sep. 10, 2012.

BACKGROUND

Computing devices such as servers may be deployed in a rack-mountable form factor may include one or more computing devices mounted in a single enclosure. Multiple enclosures including these rack-mountable computing devices may be co-located and/or centrally located in a server farm or data center. Sever farms or data centers having multiple enclosures usually require expensive specialized cooling systems to remove heat generated by numerous computing devices in a relatively close proximity to each other.

Another type of form factor for computing devices may be tower or pedestal style server enclosures. Tower server enclosures may be free standing and located in decentralized locations throughout a building or within a geographic location. Since Tower server enclosures may typically include fans to remove generated heat, specialized cooling systems may not be needed. However, managing or controlling computing devices located in decentralized locations can be labor intensive and possibly inefficient.

BRIEF DESCRIPTION OF THE DRAWINGS

FIG. 6 illustrates an example logic flow for controlling or managing computing devices.

DETAILED DESCRIPTION

As contemplated in the present disclosure, rack-mountable servers may require expensive, specialized cooling systems. Further, dispersing servers or computing devices in a decentralized manner may reduce or eliminate the need for specialized cooling. However, the decentralized deployment may lead to added asset tracking and manageability costs due to a lack of consistent, modular or integrated server management techniques. It is with respect to these and other challenges that the examples described herein are needed.

In some examples, techniques are implemented for managing or controlling one or more computing devices. For these examples, asset information associated with computing devices separately housed in respective decentralized locations may be received. Additional asset information associated with each of the computing devices may be gathered. The additional asset information may be gathered via network communication links coupled to the computing devices. The received asset information and the additional asset information may then be stored (e.g., in a database). According to some examples, a first portion of the computing devices may be grouped to create a first virtual rack based, at least in part, on the stored asset information. An operating parameter of one or more computing devices included in the first virtual rack may then be managed or controlled.

Figure 1:
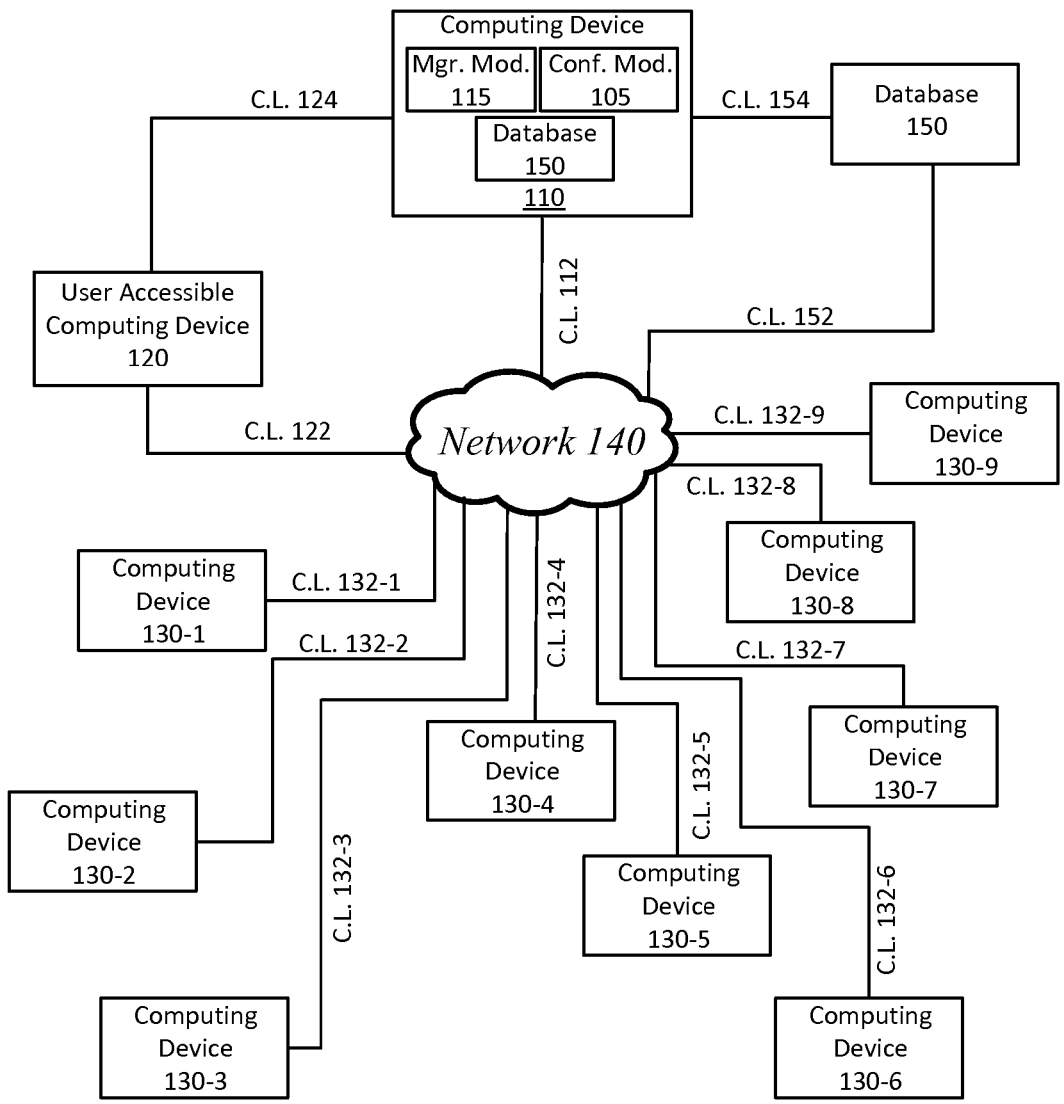
FIG. 1 illustrates an example first system.

FIG. 1 illustrates an example first system. In some examples, as shown in FIG. 1, the example first system includes system 100. As shown in FIG. 1, system 100 includes a computing device 110, user accessible computing device 120, computing devices 130-1 to 130-9 and a database 150. Also as shown in FIG. 1, the various computing devices and database 150 may communicatively couple to each other via separate network communication links (C.L.s) coupled to a network 140. For these examples, computing device 110, user accessible computing device 120 and data base 150 may couple to network 140 via C.L.s 112, 122 and 152, respectively. Also, computing devices 130-1 to 130-9 may couple to network 140 via C.L.s 132-1 to 132-9, respectively. This disclosure is not limited to the number or types of computing devices shown in FIG. 1, any number and/or types of computing devices are contemplated by this disclosure.

In some examples, rather than communicatively coupling through network 140, additional communication links may communicatively couple user accessible computing device 120 or database 150 directly to computing device 110. For example, as shown in FIG. 1, C.L. 124 may couple user accessible computing device 120 directly to computing device 110. Also, as shown in FIG. 1, C.L. 154 may couple database 150 directly to computing device 110.

According to some examples, as shown in FIG. 1, computing device 110 includes a manager module (Mgr. Mod.) 115 or a configuration module (Conf. Mod.) 105. As described more below, logic at or with manager module 115 or configuration module 105 may receive/gather asset information associated with computing devices 130-1 to 130-9, group computing devices and manage/control the grouped computing devices.

In some examples, rather than storing information in an external database 150 coupled to computing device 110 via C.L. 154 or through network 140, information may be stored at computing device 150. For these examples, at least a portion of database 150 may be maintained at or located with computing device 110. Internal communication links or buses (not shown) may be used to store or access information maintained at database 150 when maintained with computing device 110.

According to some examples, database 150, whether maintained at computing device 110 or external to computing device 110, may serve as a local database accessible to configuration module 105 or manager module 115. For these examples, database 150 may serve as a local database based on whether database 150 has acceptable access latencies to both store and access asset information. For example, access latencies of greater than 4-5 milliseconds (ms) may be unacceptable for efficiently managing or controlling computing devices 130-1 to 130-9 using the asset information stored in database 150. For the example latency threshold of 4-5 ms, considerations of the type of memory used for database 150, network communication link data rates, direct communication link data rates, or proximate distance between computing device 110 and database 150 may all need to be considered to ensure the example latency threshold is not exceeded.

According to some examples, database 150 may be arranged to at least temporarily store information obtained by either configuration module 105 or manager module 115. Database 150 may include various types of non-volatile memory and may include at least one or a combination of different types of storage devices located with computing device 110, directly accessible to computing device 110 or accessible via a network connection. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change memory (PCM)). As mentioned previously and shown in FIG. 1, database 150 may be located with computing device 110, directly accessible to computing device 110 via C.L. 152 or accessible to computing device through network 140 via C.L. 112.

According to some examples, network 140 may be configured to operate as a local access network (LAN). For example, network 140 may be operated according to one or more communication standards or protocols such as those associated with progenies and/or variants of Institute of Electrical and Electronics Engineers (IEEE) 802.3-2008, Carrier sense Multiple access with Collision Detection (CSMA/CD) Access Method and Physical Layer Specifications, Published in December 2008 (hereinafter "the Ethernet standard"). Also, the various C.L.s coupled to network 140 as shown in FIG. 1 may also be configured to operate in compliance with the Ethernet standard.

In some examples, user accessible computing device 120 may include logic and/or features (e.g., user-interface, keyboard, touch screen, voice recognition, etc.) to enable a user (not shown) to provide asset information associated with computing devices 130-1 to 130-9 to computing device 110. For these examples, computing devices 130-1 to 130-9 may be separately housed in respective decentralized locations (e.g., dispersed throughout a building, a campus or a geographic area). The user may have collected at least some asset information for computing device 130-1 to 130-9. This collected information may include separate identification numbers or a type of usage configuration (e.g., web site hosting).

As mentioned in more detail below, configuration module 105 may receive the asset information provided by the user, gather additional asset information associated with computing devices 130-1 to 130-9 and store both the received asset information and the gathered additional asset information in database 150. Manager module 115 may then group a portion of computing devices 130-1 to 130-9 based on the asset information stored in database 150. Manager module 115 may then manage or control an operating parameter of one or more computing devices included in this group.

Figure 2:
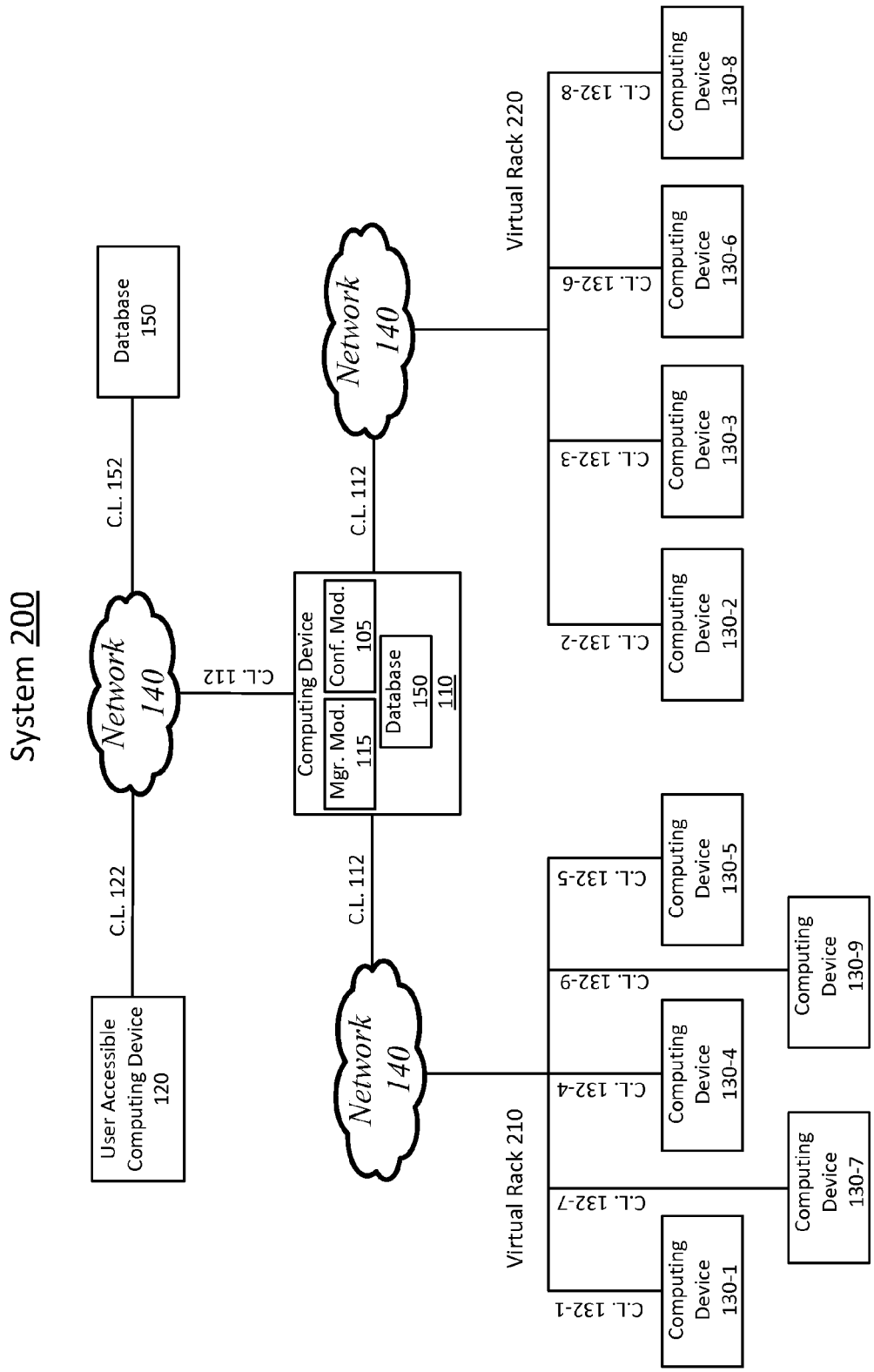
FIG. 2 illustrates an example second system.

FIG. 2 illustrates an example second system. In some examples, as shown in FIG. 2, the second system includes system 200. As shown in FIG. 2, system 200 includes all of the elements described above for FIG. 1. In some examples, as depicted in FIG. 2, a first portion of computing devices 130-1 to 130-9 may be grouped into a first virtual rack 210 and a second portion may be grouped into a second virtual rack 220. Virtual rack 210 is shown in FIG. 2 as including computing devices 130-1, 130-4, 130-5, 130-7 and 130-9. Virtual rack 220 is shown in FIG. 2 as including computing devices 130-2, 130-3, 130-6 and 130-8. This disclosure is not limited to the number of virtual racks shown in FIG. 2, but may include any number of virtual racks each including any number of computing devices.

According to some examples, manager module 115 may have grouped computing devices 130-1, 130-4, 130-5, 130-7 and 130-9 to create virtual rack 210 and grouped computing 130-2, 130-3, 130-6 and 130-8 to create virtual rack 220 based on asset information stored in database 150. For these examples, the stored asset information may have been received or gathered by configuration module 105 and stored in database 150. The asset information stored in database 150 may have indicated various similarities between the computing devices included in virtual rack 210 or included in virtual rack 220. Based at least on these similarities, manager module 115 may have grouped computing devices 130-1 to 130-9 as shown in FIG. 2 to create virtual racks 210 and 220.

In some examples, the similarities indicated in the asset information stored in database 150 may have indicated that the computing devices included in a given virtual rack had a similar type of usage configuration. Similar types of usage configurations may include, but are not limited to, configurations associated with website hosting, online game hosting, data storage, cloud services or software as a service hosting. In some other examples, the similarities indicated in the asset information stored in database 150 may have indicated that the computing devices included in a given virtual rack had similar hardware elements or configurations. Similar hardware elements or configurations may include, but are not limited to, hardware elements such as processor models, memory capacity or types and/or number of peripheral component interconnect (PCI) devices supported (e.g., network interface cards, co-processors, offload engines, etc.).

In some examples, manager module 115 may include logic and/or features configured to manage or control operating parameters of one or more computing devices included in virtual rack 210 or virtual rack 220. These operating parameters may include, but are not limited to, a basic input output system (BIOS) setting, a power usage setting, a processor utilization setting, a data throughput setting, a memory utilization setting or a thermal sensor alarm setting. For these examples, manager module 115 may uniformly manage or control all computing devices included in a given virtual rack or may individually manage or control computing devices included in the given virtual rack.

In some examples, as shown in FIG. 2, computing device 110, user accessible computing device 120, database 150 and the computing devices included in either virtual racks 210 or 220 may communicatively couple through network 140 via separate C.L.s. For these examples, network 140 may be a single LAN network that communicatively couples the elements shown in FIG. 2.

In alternative examples, although not shown in FIG. 2, user accessible computing device 120 and/or database 150 may communicatively couple to computing device 110 via a different network then network 140. For these alternative examples, one or more different networks may be separately maintained from network 140. For example, user accessible computing device 120 and/or database 150 may couple to computing device 100 through a larger network such as the Internet, a wide area network (WAN), a metropolitan area network (MAN) or a campus area network (CAN). This disclosure is not limited to these types of larger networks.

Figure 3:
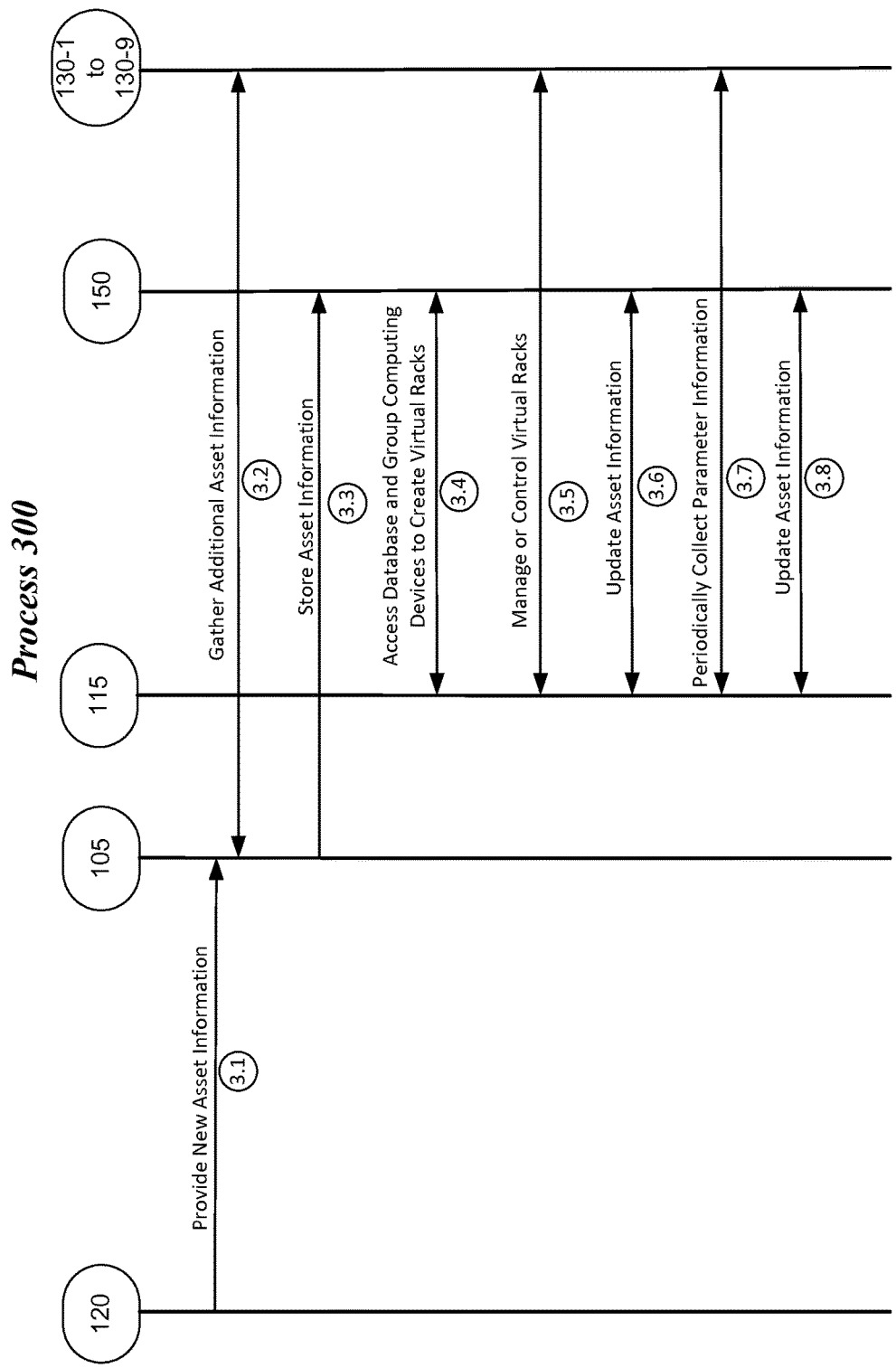
FIG. 3 illustrates an example first process.

FIG. 3 illustrates a first example process 300. In some examples, process 300 may be for receiving/gathering asset information associated with computing devices, grouping the computing devices to create virtual rack(s) and then managing or controlling at least some operating parameters of computing devices included in the virtual rack(s). For these examples, elements of systems 100 or 200 as shown in FIGS. 1 and 2 may be used to illustrate example operations related to process 300. The described example operations are not limited to these elements as shown in FIGS. 1 and 2.

Beginning at process 3.1 (Provide New Asset Information), a user-interface included at user accessible computing device 120 may be capable of enabling a user to enter asset information associated with computing devices 130-1 to 130-9. The entered information, for example, may be sent to computing device 110 and received by configuration module 105. In some examples, the asset information provided by the user may include separate identification numbers for computing devices 130-1 to 130-9. For these examples, the user may provide identification numbers in order to enable configuration module 105 to recognize those computing devices that are to be part of possible groupings of computing devices.

According to some examples, the asset information provided by the user may also include a type of usage configuration for each of the computing devices. For these examples, the usage configuration may include, but are not limited to, configurations associated with website hosting, online game hosting, data storage, cloud services or software as a service hosting. One or more computing devices from among computing devices 130-1 to 130-9, for example, may have been configured by the user to support a given type of usage configurations. The one or more computing devices from among computing devices 130-1 to 130-9, may have been configured based on particular capabilities or computing resources the one or more computing devices may have available for supporting a given type of usage configuration.

Proceeding to process 3.2 (Gather Additional Asset Information), logic and/or features of configuration module 105 may be capable of gathering additional asset information associated with computing devices 130-1 to 130-9. According to some examples, the additional asset information may be received from a plurality of computing devices that includes computing devices 130-1 to 130-9. For these examples, the plurality of computing devices may have sent messages including the additional asset information. The messages may have been sent either directly to configuration module 105 or via broadcast messages to all computing devices coupled to network 140. In either case, these messages may include identification numbers to identify the source of the message. As mentioned above, identification numbers were received from a user for computing devices 130-1 to 130-9. For these examples, configuration module 105 gathers the additional asset information for computing devices 130-1 to 130-9 based on the prior receipt of their respective identification numbers from the user. The messages received from the other computing devices may be ignored.

According to some other examples, configuration module 105 may include logic and/or features to probe a plurality of computing devices via request for additional asset information. For these examples, messages may be sent to configuration module 105 in response to the request for additional asset information. For similar reasons mentioned above, configuration module 105 gathers the additional asset information from messages from computing devices 130-1 to 130-9 based on the prior receipt of their respective identification numbers from the user. The messages received from the other computing devices may be ignored.

In some examples, the additional asset information may indicate hardware elements or operating configurations for computing devices 130-1 to 130-9. For example, the additional asset information may indicate hardware elements such as types of processors or processor models, memory configurations and/or capacities or types and/or number of PCI devices supported. The additional asset information may also indicate operating configurations such as disk storage information (e.g., memory storage schemes such as redundant array of independent disks (RAID) schemes) or network addressing information (e.g., media access control (MAC) addresses), Proceeding to process 3.3 (Store Asset Information), configuration module 105 may include logic and/or features capable of storing both the asset information obtained from the user and the additional asset information gathered from computing devices 130-1 to 130-9 in database 150. In some examples, database 150 may be located with computing device 110. In other examples, database 150 may be separate from computing device 110 and accessible to configuration module 105 via either a direct communication link or through network 140.

Proceeding to process 3.4 (Access Database and Group Computing Devices to Create Virtual Racks), manager module 115 may include logic and/or features to access the asset information stored in database 150. According to some examples, manager module 115 may group computing devices 130-1 to 130-9 into virtual racks 210 and 220 based on the accessed asset information. For these examples, the asset information may have indicated various similarities between the computing devices grouped into virtual rack 210 or virtual rack 220. For example, virtual rack 210 may include computing devices having a website hosting usage configuration and virtual rack 220 may include computing devices having a data storage usage configuration.

Proceeding to process 3.5 (Manage or Control Virtual Racks), manager module 115 may include logic and/or features to manage or control an operating parameter for one or more computing devices included in virtual rack 210 or virtual rack 220. As described more below, the operating parameter may be managed or controlled responsive to requests received from a user.

Proceeding to process 3.6 (Update Asset Information), manager module 115 may include logic and/or features to update asset information for the one or more computing devices included in virtual rack 210 or virtual rack 220 based on updated parameter information associated with managing or controlling the operating parameter. For example, if an operating parameter such as a thermal sensor alarm setting is changed for computing device 130-1 in virtual rack 210, then the asset information for computing device 130-1 is updated and then stored in database 150.

Proceeding to process 3.7 (Periodically Collect Parameter Information), manager module 115 may include logic and/or features to periodically collect parameter information associated with the operating parameter being managed or controlled from the one or more computing devices included in virtual racks 210 or 220. In some examples, parameter information such as BIOS settings, power usage settings, processor utilization setting, data throughput settings, memory utilization settings or thermal sensor alarm settings may be collected.

Proceeding to process 3.8 (Update Asset Information), manager module 115 may update the asset information for one or more computing devices included in virtual rack 210 or virtual rack 220 based on the collected parameter information. In some examples manager module 115 may update the asset information if the periodically collected parameter information indicates a change in the operating parameter being managed. For example, a processor utilization setting or memory utilization setting for a computing device may have changed.

According to some examples, the process may then return to either process 3.1, 3.5 or 3.8. As mentioned above, process 3.1 or 3.5 may depend on user-initiated actions and process 3.8 may occur periodically.

Figure 4:
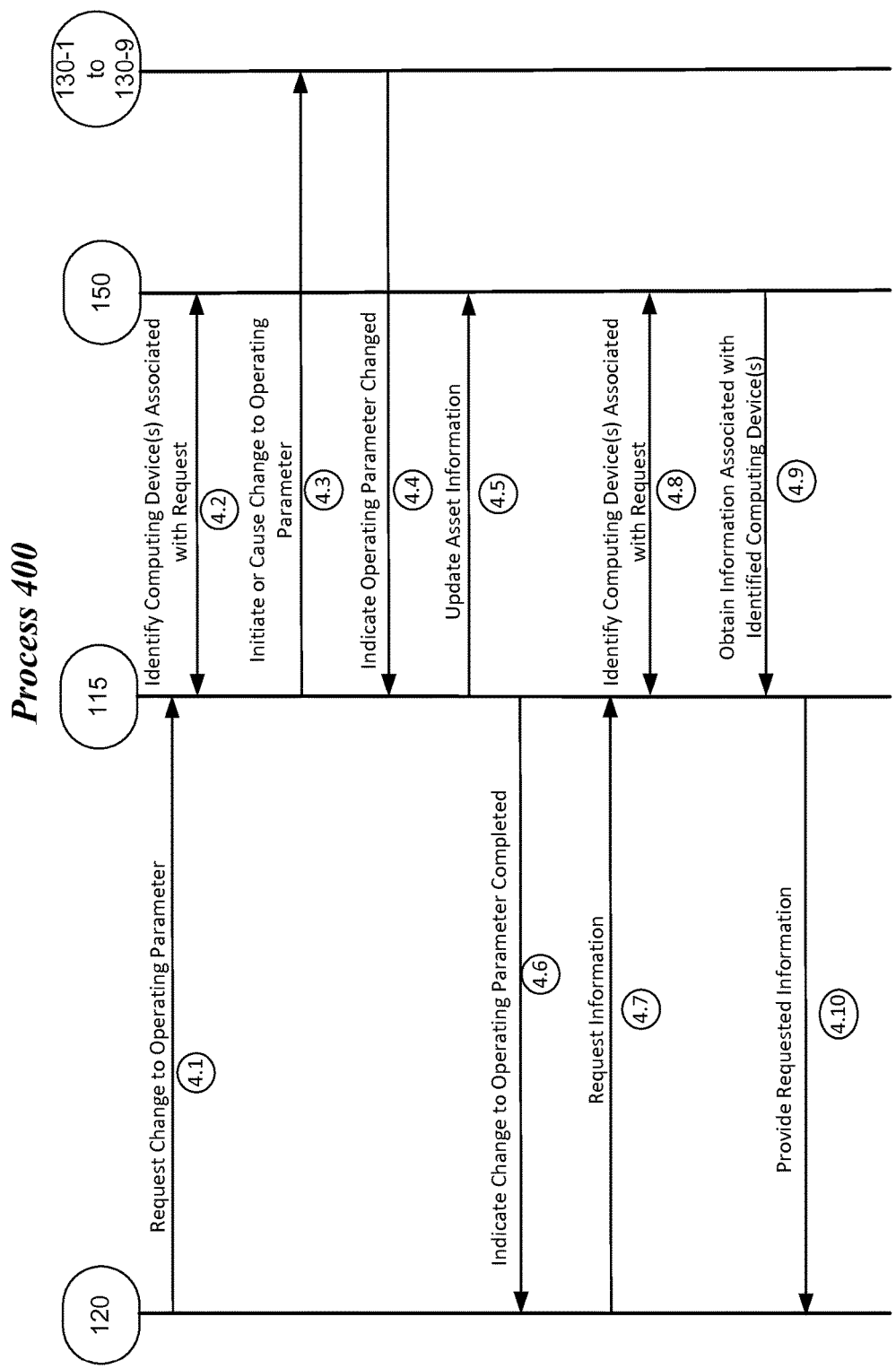
FIG. 4 illustrates an example second process.

FIG. 4 illustrates a second example process 400. In some examples, process 400 may be for receiving requests to change an operating parameter or obtain information associated with computing devices included in virtual rack(s) and indicate to the requestor that the operating parameter has been changed or provide the information to the requestor. For these examples, elements of systems 100 or 200 as shown in FIGS. 1 and 2 may be used to illustrate example operations related to process 300. The described example operations are not limited to these elements as shown in FIGS. 1 and 2.

Beginning at process 4.1 (Request Change to Operating Parameter), a user-interface included at user accessible computing device 120 may be capable of enabling a user to request a change to an operating parameter for one or more computing devices from among computing devices 130-1 to 130-9. The request may include, but is not limited to, a request for to change a BIOS setting, a power usage setting, a processor utilization setting, a data throughput setting, a memory utilization setting or a thermal sensor alarm setting. According to some examples, the user may request a change that impacts all or some of the computing devices included in a given virtual rack. For example, the user may want to change the data throughput setting for those computing devices included in virtual rack 210. For this example, the computing devices included in virtual rack 210 may be website hosting computing devices and the user may desire to see higher data throughput settings for computing devices in this type of usage configuration. In some other examples, the user may specifically identify the computing device via its identification number.

Proceeding to process 4.2 (Identify Computing Device(s) Associated with the Request), manager module 115 may include logic and/or features to of access database 150, obtain asset information associated with virtual racks 210 or 220 and identify which computing device(s) included in these virtual racks may be associated with the request.

Proceeding to process 4.3 (Initiate or Cause Change to Operating Parameter), manager module 115 may include logic and/or features capable of initiating or cause the operating parameter identified in the request to be changed. In some examples, manager module 115 may initiate the change for all the computing devices in a given virtual rack. In other examples, manager module 115 may initiate the change to a portion of the computing devices included in a given virtual rack.

Proceeding to process 4.4 (Indicate Operating Parameter Changed), manager module 115 may include logic and/or features to receive indications from the one or more computing devices that the operating parameter change initiated by manager module 115 has been completed.

Proceeding to process 4.5 (Update Asset Information), manager module 115 may include logic and/or features to update asset information for those computing devices for which the operating parameter was changed.

Proceeding to process 4.6 (Indicate Change to Operating Parameter Completed), manager module 115 may include logic and/or features to indicate to the user at user accessible computing device 120 that the requested changed to the operating parameter has been completed.

Proceeding to process 4.7 (Request Information), manager module 115 may include logic and/or features to receive an information request for operating parameters for one or more computing devices from among computing devices 130-1 to 130-9. For example, the user may request memory utilization settings for one or more computing devices. The request may either indicate identification numbers for the one or more computing devises or indicate a usage configuration for the request.

Proceeding to process 4.8 (Identify Computing Device(s) Associated with Request), manager module 115 may access database 150, obtain asset information associated with virtual racks 210 or 220 and identify which computing device(s) included in these virtual racks may be associated with the request for information.

Proceeding to process 4.9 (Obtain Information Associated with Identified Computing Device(s)), manager module 115 may extract the requested information from the asset information associated with virtual racks 210 or 220 that was obtained from database 150.

Proceeding to process 4.10 (Provide Requested Information), manager module 115 may include logic and/or features to format the extracted information obtained from database 150 and then provide the requested information to the use at user accessible computing device 120. In some examples, the requested information is formatted to provide the requested information to the user in a presentation format that may be user friendly or formatted according to user preferences.

According to some examples, the process may then return to either process 4.1 or 4.7. As mentioned above, these processes may depend on user-initiated actions.

Figure 5:
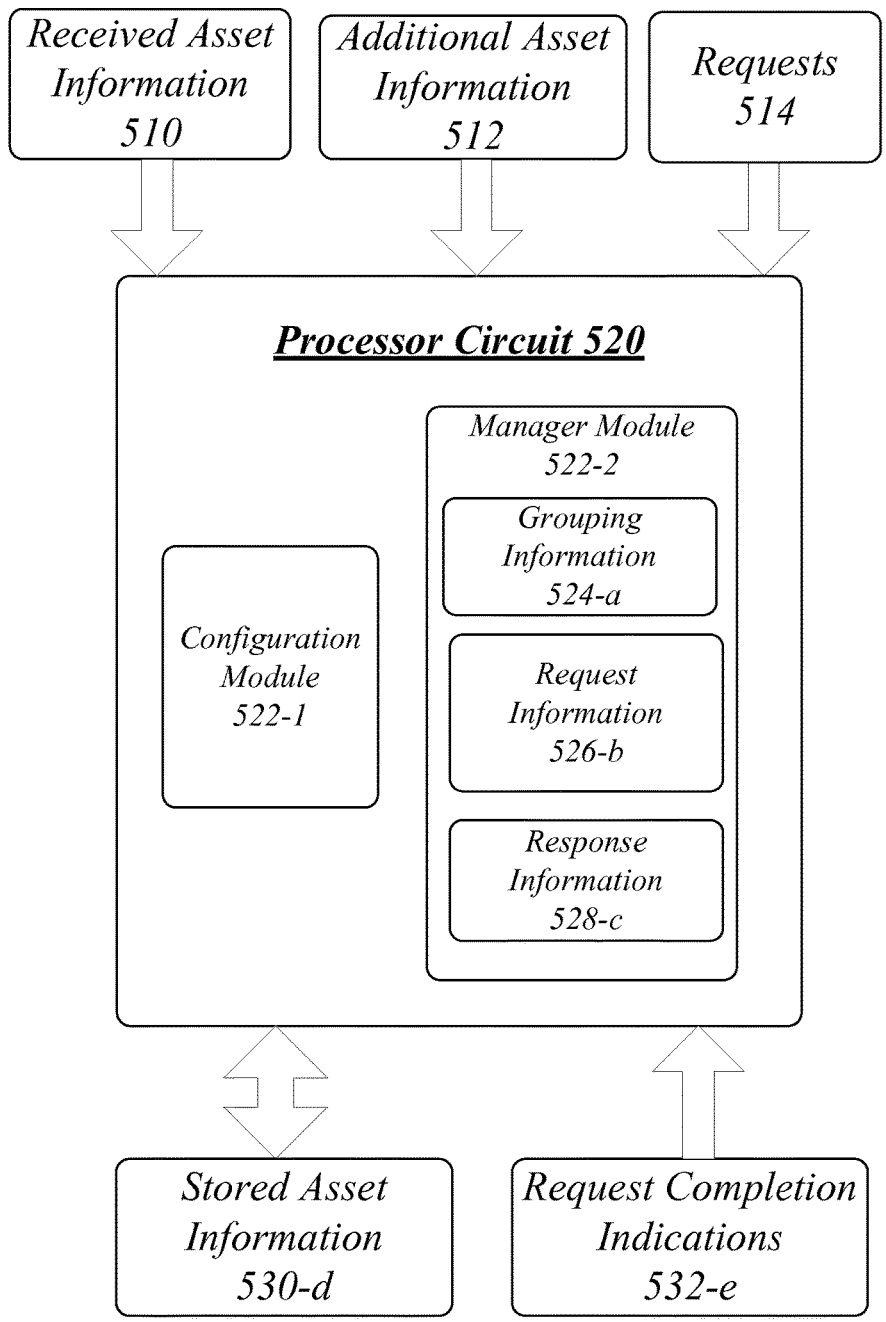
FIG. 5 illustrates an example apparatus.

FIG. 5 illustrates an example apparatus 500. Although the apparatus 500 shown in FIG. 5 has a limited number of elements in a certain topology, it may be appreciated that the apparatus 500 may include more or less elements in alternate topologies as desired for a given implementation.

The apparatus 500 may comprise a computer-implemented apparatus 500 having a processor circuit 520 arranged to execute one or more software components 522-*a*. It is worthy to note that "a" and "b" and "c" and similar designators as used herein are intended to be variables representing any positive integer. Thus, for example, if an implementation sets a value for a=5, then a complete set of software components 522-*a* may include components 522-1 or 522-2. The embodiments are not limited in this context.

According to some examples, apparatus 500 may be capable of being located with a computing device (e.g., located at or within computing device 110). For these examples, apparatus 500 may be included in or implemented on a computing platform for the computing device. The examples are not limited in this context.

In some examples, as shown in FIG. 5, apparatus 500 includes processor circuit 520. Processor circuit 520 may be generally arranged to execute one or more software components 522-*a*. The processing circuit 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processing circuit 520.

According to some examples, apparatus 500 may include a configuration module 522-1. Configuration module 522-1 may be arranged for execution by processor circuit 520 to receive asset information 510. For these examples asset information 510 may be associated with computing devices separately housed in respective decentralized locations. Asset information 510 may have been sent from a user accessible computing device and may include, but is not limited to, identification numbers assigned by a user and/or a type of usage configuration for each of the computing devices.

In some examples, configuration module 522-1 may also be configured to gather additional asset information 512 associated with each of the computing devices. Additional asset information 512 may be gathered via network communication links coupled to the computing devices. Additional asset information may include, but is not limited to, separate identification numbers for each of the computing devices, a processor model number associated with each of the computing devices, a memory capacity for each of the computing devices, disk storage information associated with each of the computing devices, network addressing information associated with each of the computing devices or peripheral component interconnect devices supported by each of the computing devices. According to some examples, Configuration module 522-1 may also be configured to store the received asset information and the additional asset information in a database (e.g., database 150) as stored asset information 530-d.

In some examples, apparatus 500 may also include a manager module 522-2. Manager module 522-2 may be arranged for execution by processor circuit 520 to group at least a first portion of the computing devices for which configuration module 522-1 receive/gathered asset information. For these examples, manager module 522-2 may group the first portion to create a first virtual rack based, at least in part, on stored asset information 530-d.

According to some examples, manager module 522-2 may be arranged to generate grouping information 524-a. For these examples, the grouping information may include information associated with the computing devices included in first virtual rack. Grouping information 524-a may also be associated with other computing devices include in one or more other virtual racks generated based on stored asset information 530-d.

In some examples, manager module 522-2 may also be configured to manage or control an operating parameter (e.g., a power setting) of one or more computing devices included in the first virtual rack. For these examples, stored asset information 530-d may be updated by manager module 522-2 based on updated parameter information associated with managing or controlling the operating parameter. Also, manager module 522-2 may be arranged to periodically collect parameter information associated with the operating parameter and then update stored asset information 530-d based on this periodically collect parameter information.

In some examples, manager module 522-2 may also be arranged to handle or manage request information 526-a associated with requests 514 received from user accessible computing device. For these examples, requests 514 may be include a request to change an operating parameter of a computing device or a request for information associated with the computing device. Requests 514 may be serviced by manager module 522-2 using stored asset information 530-d.

According to some examples, manager module 522-2 may also be arranged to determine (handle) response information 528-c associated with a responses requests 514. For these examples, response information 528-c may be formatted for presentation to the originator of requests 514 (e.g., a user at user accessible computer 120). Response information 528-c may include operating parameter information associated with one or more computing devices or may include indications of a completion of a request to change an operating parameter for one or more computing devices.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates a logic flow 600 for managing or controlling computing devices in accordance with one or more examples. Logic flow 600 may be performed by various systems and/or devices and may be implemented as hardware, software, and/or any combination thereof, as desired for a given set of design parameters or performance constraints. For example, the logic flow 600 may be implemented by a logic device (e.g., processor circuit 520) and/or logic (e.g., instructions, data, and/or code) to be executed by a logic device. For purposes of illustration, and not limitation, the logic flow 600 is described with reference to FIGS. 1-5.

According to some examples, logic flow 600 may receive asset information associated with computing devices separately housed in respective decentralized locations at block 602. For example, configuration module 105 may include logic and/or features (e.g., located with or at computing device 110) to receive the asset information associated with computing devices 130-1 to 130-9 via a communication link (via a network or direct). For these examples, the asset information may have been received from user accessible computing device 120 and may include a type of usage configuration for each of the computing devices.

In some examples, logic flow 600 may gather additional asset information associated with each of the computing devices and the additional asset information may be gathered via network communication links coupled to the computing devices at blocks 604 and 606. For example, additional asset information may have been gathered from computing devices 130-1 to 130-9 via receipt of additional asset information sent from these computing devices via broadcast messages or via probing of computing devices.

According to some examples, logic flow 600 may store the received asset information and the additional asset information at block 608. For example, configuration module 105 may store the received asset information and the additional asset information in database 150.

In some examples, logic flow 600 may group a first portion of the computing devices to create a first virtual rack based, at least in part, on the stored asset information at block 610. For example, manager module 115 may access database 150 and use the asset information received/gathered by configuration module 105 to group computing devices 130-1, 4, 5, 7 and 9 to create a first virtual rack 210. Manager module 115 may also group computing device 130-2, 3, 6 and 8 to create a second virtual rack 220.

According to some examples, logic flow 600 may manage or control an operating parameter of one or more computing devices included in the first virtual rack. For example, manager module 115 may manage or control an operating parameter (e.g., a power setting) for one or more computing devices included in virtual rack 210. Managing or controlling the operating parameter may include receiving requests from a user to change the operating parameter or receiving requests for information associated with the operating parameter.

Figure 7:
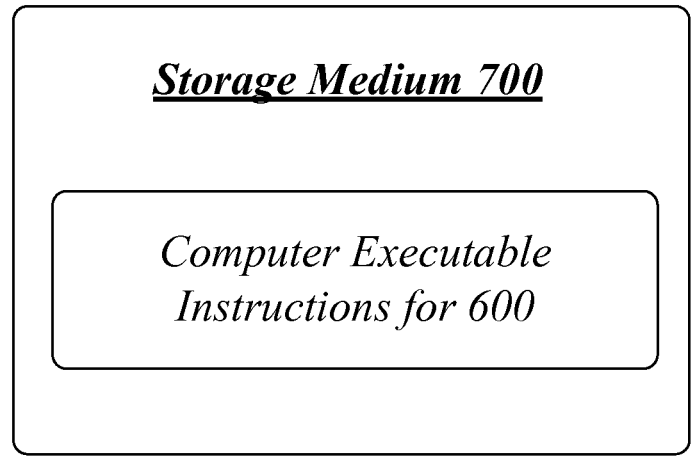
FIG. 7 illustrates an example storage medium.

FIG. 7 illustrates an embodiment of a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
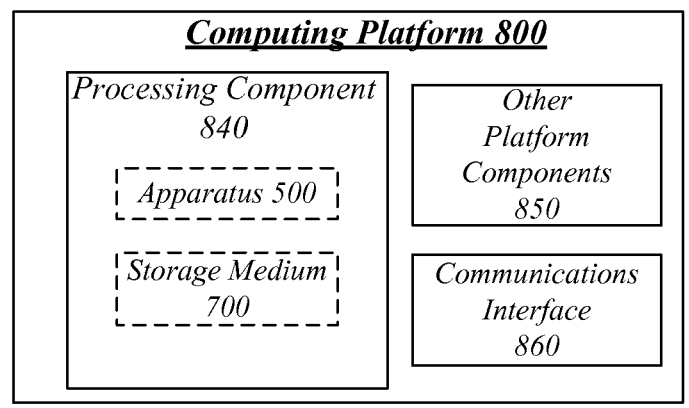
FIG. 8 illustrates an example computing platform.

FIG. 8 illustrates an example computing platform 800. In some examples, as shown in FIG. 8, computing platform 800 may include a processing component 840, other platform components or a communications interface 860. Computing platform 800 may be included in computing devices such as the computing devices described and shown above for FIGS. 1-5. According to some examples, computing platform 800 may be implemented in a computing device such as computing device 110 in order to provide logic and/or features to support managing or controlling other computing devices possibly grouped into virtual racks as mentioned above.

According to some examples, processing component 840 may execute processing operations or logic for apparatus 500 and/or storage medium 700. Processing component 840 may include various hardware elements, software elements, or a combination of both. Examples of hardware elements may include devices, logic devices, components, processors, microprocessors, circuits, processor circuits (e.g., processor circuit 520 in FIG. 5), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the System Management Bus (SMBus) specification, the PCI Express specification, the Serial Advanced Technology Attachment (SATA) specification or the Universal Serial Bus (USB) specification. Network communications may occur via use of communication protocols or standards such those described in the Ethernet standard.

Computing platform 800 may be part of a computing device that may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, example methods may include receiving asset information associated with computing devices separately housed in respective decentralized locations. The received asset information may include a type of usage configuration for each of the computing devices. These example methods may also include gathering additional asset information associated with each of the computing devices. The additional asset information may be gathered via network communication links coupled to the computing devices. The received asset information and the additional asset information may then be stored. A first portion of the computing devices may then be grouped to create a first virtual rack based, at least in part, on the stored asset information. An operating parameter of one or more computing devices included in the first virtual rack may then be managed or controlled. Parameter information associated with the operating parameter may then be collected on a periodic basis and the stored asset information may be updated based on the periodically collected parameter information.

According to some examples for the example methods, the stored asset information may be stored based on updated parameter information associated with managing or controlling the operating parameter.

According to some examples for the example methods, the operating parameter may be at least one of a basic input output system (BIOS) setting, a power usage setting, a processor utilization setting, a data throughput setting, a memory utilization setting or a thermal sensor alarm setting.

In some examples for the example methods, the received asset information may include identification numbers for each of the computing devices.

According to some examples for the example methods, gathering the additional asset information may include receiving the additional asset information from a plurality of computing devices and gathering the additional asset information for computing devices having identification numbers included in the received asset information.

In some examples for the example methods, gathering the additional asset information may include probing a plurality of computing devices via network communication links coupled to the plurality of computing devices, determining which computing devices from among the plurality of computing devices have identification numbers included in the received asset information and gathering the additional asset information for computing devices having identification numbers included in the received asset information.

According to some examples for the example methods, grouping at least the first portion of the computing devices may include grouping the first portion based on a similar type of usage configuration.

In some examples for the example methods, the additional asset information associated with each of the computing devices may include one or more of a separate identification number for each of the computing devices, a processor model number associated with each of the computing devices, a memory capacity for each of the computing devices, disk storage information associated with each of the computing devices, network addressing information associated with each of the computing devices or peripheral component interconnect devices supported by each of the computing devices.

According to some examples for the example methods, grouping at least the first portion of the computing devices may include grouping the first portion based on a similar processor model number, a similar memory capacity, or similar peripheral component interconnect devices supported.

In some examples for the example methods, managing or controlling the operating parameter may include receiving a request to change the operating parameter for at least one computing device included in the first virtual rack, accessing the database to identify the at least one computing device, causing the change to the operating parameter and updating the stored asset information based on the change to the operating parameter.

According to some examples for the example methods, managing or controlling the operating parameter may include receiving a request for information associated with at least one computing device included in the first virtual rack, accessing the database to obtain the information from the stored asset information and providing the requested information to the requestor.

In some examples for the example methods, a second portion of the computing devices may be grouped to create a second virtual rack based, at least in part, on the stored asset information. For these examples an operating parameter of one or more computing devices included in the second virtual rack may be managed or controlled.

According to some examples, at least one machine readable medium comprising a plurality of instructions that in response to being executed on a system cause the system to carry out the example method as mentioned above.

According to some examples, an example apparatus may include a processor circuit a configuration module and a manager module. For these examples, the configuration module may be arranged for execution by the processor circuit to receive asset information associated with computing devices separately housed in respective decentralized locations. The received asset information may include a type of usage configuration for each of the computing devices. The configuration module may also be arranged to gather additional asset information associated with each of the computing devices. The additional asset information may be gathered via network communication links coupled to the computing devices. The configuration manager may then store the received asset information and the additional asset information. Also, for these examples, the manager module may be arranged for execution by the processor circuit to group at least a first portion of the computing devices to create a first virtual rack based on the stored asset information and on a similar type of usage configuration. The manager module may also be arranged to manage or control an operating parameter of one or more computing devices included in the first virtual rack. The manager module may also periodically collect parameter information associated with the operating parameter to cause the configuration module to periodically update the stored asset information based on the periodically collected parameter information.

In some examples for the example apparatus, the manager module may also arranged to update the stored asset information based on updated parameter information associated with managing or controlling the operating parameter.

According to some examples for the example apparatus, the operating parameter may include at least one of a basic input output system (BIOS) setting, a power usage setting, a processor utilization setting, a data throughput setting, a memory utilization setting or a thermal sensor setting.

In some examples for the example apparatus, the manager module may manage or control the operating parameter by being arranged to receive a request to change the operating parameter for at least one computing device included in the first virtual rack, access the database to identify the at least one computing device, cause the change to the operating parameter and cause the configuration manager to update the stored asset information based on the change to the operating parameter.

According to some examples for the example apparatus, the manager module may manage or control the operating parameter by being arranged to receive a request for information associated with at least one computing device included in the first virtual rack, access the database to obtain the information from the stored asset information and provide the requested information to the requestor.

According to some examples for the example apparatus, the received asset information may include identification numbers for each of the computing devices. For these examples, the configuration module may gather the additional asset information by gathering the additional asset information for computing devices having identification numbers included in the received asset information.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving asset information associated with computing devices separately housed in respective decentralized locations, the received asset information including indications of:
      a type of usage configuration for each of the computing devices, the usage configuration for at least one of the computing devices comprising data storage and the usage configuration for at least one other of the computing devices comprising software as a service; and
      at least one identification number of the computing devices;
   gathering additional asset information associated with each of the computing devices, the additional asset information gathered via network communication links coupled to the computing devices, the additional asset information comprising at least one of a hardware element or operating configuration of the computing devices;
   storing the received asset information and the additional asset information in a database;
   grouping a first portion of the computing devices to create a first virtual rack based, at least in part, on the stored asset information and the types of usage configuration;
   managing or controlling an operating parameter of one or more computing devices included in the first virtual rack;
   collecting, on a periodic basis, parameter information associated with the operating parameter;
   receiving a request to change the operating parameter for at least one computing device included in the first virtual rack;
   accessing the database to identify the at least one computing device;
   causing the change to the operating parameter; and
   updating the stored asset information based on the change to the operating parameter.

2. The method of claim 1, comprising updating the stored asset information based on updated parameter information associated with managing or controlling the operating parameter.

3. The method of claim 1, the operating parameter comprising at least one of a basic input output system (BIOS) setting, a power usage setting, a processor utilization setting, a data throughput setting, a memory utilization setting or a thermal sensor alarm setting.

4. The method of claim 1, gathering the additional asset information comprises receiving the additional asset information from a plurality of computing devices and gathering the additional asset information for computing devices having identification numbers included in the received asset information.

5. The method of claim 1, gathering the additional asset information comprises probing a plurality of computing devices via network communication links coupled to the plurality of computing devices, determining which computing devices from among the plurality of computing devices have identification numbers included in the received asset information and gathering the additional asset information for computing devices having identification numbers included in the received asset information.

6. The method of claim 1, grouping at least the first portion of the computing devices comprises grouping the first portion based on a similar type of usage configuration, the types of usage configuration comprising at least one of website hosting, online game hosting, data storage, cloud services or software as a service hosting.

7. The method of claim 1, the additional asset information associated with each of the computing devices comprising one or more of a separate identification number for each of the computing devices, a processor model number associated with each of the computing devices, a memory capacity for each of the computing devices, disk storage information associated with each of the computing devices, network addressing information associated with each of the computing devices or peripheral component interconnect devices supported by each of the computing devices.

8. The method of claim 7, grouping at least the first portion of the computing devices comprises grouping the first portion based on a similar processor model number, a similar memory capacity, or similar peripheral component interconnect devices supported.

9. The method of claim 1, storing the received asset information and the additional asset information in a database, managing or controlling the operating parameter comprises receiving a request for information associated with at least one computing device included in the first virtual rack, accessing the database to obtain the information from the stored asset information and providing the requested information to the requestor.

10. The method of claim 1, comprising:
    grouping a second portion of the computing devices to create a second virtual rack based, at least in part, on the stored asset information; and
    managing or controlling an operating parameter of one or more computing devices included in the second virtual rack.

11. An apparatus comprising:
    a processor circuit;
    a configuration module arranged for execution by the processor circuit to:
       receive asset information associated with computing devices separately housed in respective decentralized locations, the received asset information to include indications of:
          a type of usage configuration for each of the computing devices, the usage configuration for at least one of the computing devices comprising data storage and the usage configuration for at least one other of the computing devices comprising software as a service; and
          at least one identification number of the computing devices;
       gather additional asset information associated with each of the computing devices, the additional asset information gathered via network communication links coupled to the computing devices, the additional asset information comprising at least one of a hardware element or operating configuration of the computing devices; and
       store the received asset information and the additional asset information in a database; and a manager module arranged for execution by the processor circuit to:
group at least a first portion of the computing devices to create a first virtual rack based on the stored asset information and on a similar type of usage configuration;
manage or control an operating parameter of one or more computing devices included in the first virtual rack;
receive a request to change the operating parameter for at least one computing device included in the first virtual rack;
access the database to identify the at least one computing device;
cause the change to the operating parameter; and
update the stored asset information based on the change to the operating parameter.

12. The apparatus of claim 11, comprising the manager module also arranged to update the stored asset information based on updated parameter information associated with managing or controlling the operating parameter.

13. The apparatus of claim 11, the operating parameter comprising at least one of a basic input output system (BIOS) setting, a power usage setting, a processor utilization setting, a data throughput setting, a memory utilization setting or a thermal sensor setting.

14. The apparatus of claim 11, the received asset information and the additional asset information stored in a database, the manager module to manage or control the operating parameter comprises the manager module arranged to receive a request to change the operating parameter for at least one computing device included in the first virtual rack, access the database to identify the at least one computing device, cause the change to the operating parameter and cause the configuration module to update the stored asset information based on the change to the operating parameter.

15. The apparatus of claim 14, the received asset information and the additional asset information stored in a database, the manager module to manage or control the operating parameter comprises the manager module arranged to receive a request for information associated with at least one computing device included in the first virtual rack, access the database to obtain the information from the stored asset information and provide the requested information to the requestor.

16. The apparatus of claim 11, comprising the received asset information to include identification numbers for each of the computing devices, the configuration module to gather the additional asset information by gathering the additional asset information for computing devices having identification numbers included in the received asset information.

17. At least one non-transitory machine readable medium comprising a plurality of instructions that in response to being executed on a system cause the system to:
receive asset information associated with computing devices separately housed in respective decentralized locations, the received asset information including indication of:
a type of usage configuration for each of the computing devices, the usage configuration for at least one of the computing devices comprising data storage and the usage configuration for at least one other of the computing devices comprising software as a service; and
at least one identification number of the computing devices;
gather additional asset information associated with each of the computing devices, the additional asset information gathered via network communication links coupled to the computing devices, the additional asset information comprising at least one of a hardware element or operating configuration of the computing devices;
store the received asset information and the additional asset information in a database;
group at least a first portion of the computing devices to create a first virtual rack based, at least in part, on the stored received asset information or the stored additional asset information and the types of usage configuration;
manage an operating parameter of at least one computing device included in the first virtual rack;
receiving a request to change the operating parameter for at least one computing device included in the first virtual rack;
accessing the database to identify the at least one computing device;
causing the change to the operating parameter; and
updating the stored asset information based on the change to the operating parameter.

18. The at least one non-transitory machine readable medium of claim 17, the operating parameter comprising at least one of a basic input output system (BIOS) setting, a power usage value, a processor utilization value, a data throughput value, a memory utilization value or a thermal sensor value.

19. The at least one non-transitory machine readable medium of claim 17, the system to gather the additional asset information comprises the system to receive the additional asset information from a plurality of computing devices and gather the additional asset information for computing devices having identification numbers included in the received asset information.

20. The at least one non-transitory machine readable medium of claim 17, the system to group at least the first portion of the computing devices comprises the system to group the first portion based on a similar type of usage configuration, the types of usage configuration comprising at least one of website hosting, online game hosting, data storage, cloud services or software as a service hosting.

21. The at least one non-transitory machine readable medium of claim 17, the additional asset information associated with each of the computing devices comprising one or more of a separate identification number for each of the computing devices, a processor model number associated with each of the computing devices, a memory capacity for each of the computing devices, disk storage information associated with each of the computing devices, network addressing information associated with each of the computing devices or peripheral component interconnect devices supported by each of the computing devices.

22. The at least one non-transitory machine readable medium of claim 19, comprising the system to group at least the first portion of the computing devices based on a similar processor model number, a similar memory capacity, or similar peripheral component interconnect devices supported.

23. The at least one non-transitory machine readable medium of claim 17, comprising the received asset information including identification numbers for each of the computing devices, the instructions to cause the system to gather additional asset information includes instructions to cause the system to:
- probe a plurality of computing devices via network communication links coupled to the plurality of computing devices,
- determine which computing devices from among the plurality of computing devices have identification numbers included in the received asset information; and
- gather the additional asset information for computing devices having identification numbers included in the received asset information.

\* \* \* \* \*